United States Patent [19]

Meyer

[11] 4,080,017
[45] Mar. 21, 1978

[54] BIKE PEDAL BEARING SYSTEM

[76] Inventor: Harlan Louis Meyer, 1247 School La., Nashville, Tenn. 37217

[21] Appl. No.: 636,307

[22] Filed: Nov. 28, 1975

[51] Int. Cl.² ............................................. F16C 19/16
[52] U.S. Cl. .................................... 308/188; 74/594.4; 280/294
[58] Field of Search ...................... 308/188, 23.5, 191, 308/179.5; 74/594.1, 594.2, 594.4

[56] References Cited

U.S. PATENT DOCUMENTS

| 673,395 | 5/1901 | Hill et al. | 74/594.4 |
| 1,449,235 | 3/1923 | Lewis | 308/179.5 |
| 3,628,838 | 12/1971 | Turin | 308/188 |
| 3,807,255 | 4/1974 | Baginski | 74/594.4 |

Primary Examiner—Joseph F. Peters, Jr.
Assistant Examiner—Gene A. Church
Attorney, Agent, or Firm—Abe Hatcher

[57] ABSTRACT

A pedal/single bearing system for transmitting a bicycle rider's load to the crank of a bicycle.

4 Claims, 3 Drawing Figures

BIKE PEDAL BEARING SYSTEM

BACKGROUND OF THE INVENTION

1. Field of the Invention

This invention relates to bicycling. More particularly, it relates to a pedal/single bearing system which transmits the load of a bicycle rider to the crank of the bicycle.

2. Description of the Prior Art

With bicycles once again becoming prominent in everyday life, it has become important for the operator's ease of riding to improve the efficiency of pedalling and riding. One way of doing this is to provide a plane of support for a rider's foot that coincides with the center of rotation. The problem is how to accomplish this.

DESCRIPTION OF THE INVENTION

After extended investigation, I have found that this can be done by providing a single bearing inside the pedal to transmit a rider's load to the crank of the bicycle. My bearing or pedal/bearing system employs inner and outer races each of which has a deep groove that will support a thrust load parallel to the center of rotation in either direction as well as radial load or load normal to the center of rotation. My single-bearing system permits the rider's foot to be lower (about ¾ of an inch) than conventional pedals without adversely affecting the angle of cornering. This has the very desirable affect of lowering the rider's center of gravity without changing the angle at which his bicycle leans when turning.

The bearing system of the invention, in conjunction with the bicycle pedal, utilizes a platform which collects the pressure from a rider's foot and distributes the load to several concentrated locations via machine screws, the load from some of the machine screws being transmitted to the pedal frame and the load from others being transmitted directly to a bearing retainer through the pedal frame. The pedal platform is preferably of a bathtub shape. This shape, together with the fact of the platform being attached on three sides, enables the load to be distributed from the rider's foot, the pedal frame to be supported in both fore and aft directions and a redundant load path to be provided in support of compressive forces normally transmitted by the pedal frame.

According to my invention the pedal frame is aided by the platform in decreasing discomfort to the bike rider and in increasing efficiency of pedalling. Thus, according to my invention the pedal frame serves the dual purpose of transmitting the primary load from rider to single bearing and at the same time time serving as a retainer for the bearing in the outward direction. My single bearing system also provides a fail-safe load path such that, in the event of a fracture at any support point, for example, at the pedal frame, machine screw or bearing retainer, the remaining support points, three in number, continue to provide a sufficient load to support a rider while he is warned of the failure by any abnormal deflection. The bearing retainer, in addition to providing a primary load function of transmitting load from the pedal frame to the bearing, also serves as a redundant load path in the event of failure. According to my invention I prefer for the hole in the bearing retainer to be smaller than the diameter of my inner bearing race.

Further advantages of my invention include provision of an efficient and safe load path in a minimum space because of use of a single bearing and use of each part of the bearing system for more than one function. Additionally, the close proximity of rider's foot to the crank not only improves cornering, as mentioned above, but also makes it possible to locate the bottom of a rider's foot at the center line plane. Also, because the load path is more efficient when my single bearing system is used, the pedal is inherently lighter. Furthermore, the center of gravity of the rider using my device is substantially lower than that of a rider using prior art systems, and power transmission from the shoe cleat or similar transmission during the lower portion of the pedalling stroke is greatly improved because of the abovementioned passing of the force applied by the rider's foot the pedal and bearing to the crank through the center of rotation. A smoother ride is provided, as is better balance, by the mass of the system being closer to the center line of the bicycle. In addition, the leverage during the lower 180° of the stroke is greater and can be increased even more by ankling.

Further features and advantages will be apparent from the description of the drawing which follows.

Figure 1:
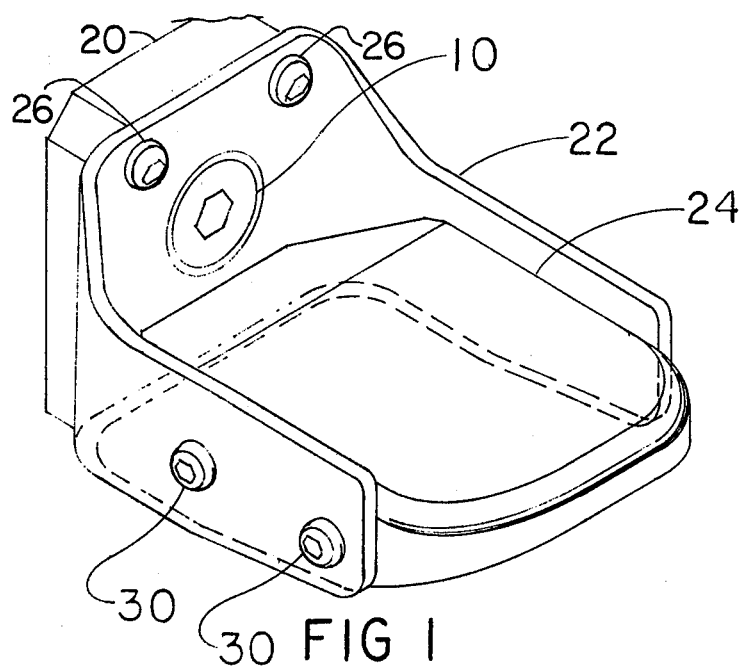
FIG. 1 is an isometric view of the bearing assembly of the invention and its associated environment.
Figure 2:
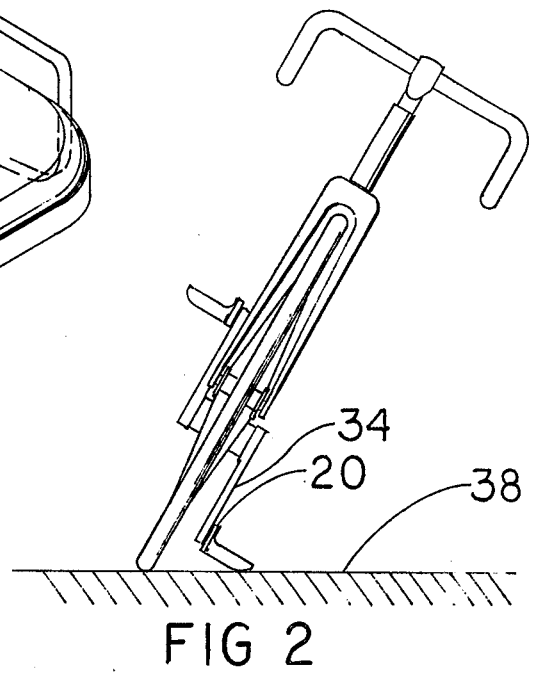
FIG. 2 depicts a bicycle turning a corner to show how my bearing assembly, by employing a space-saving single bearing, improves cornering by enabling the pedal to be closer to the crank.
Figure 3:
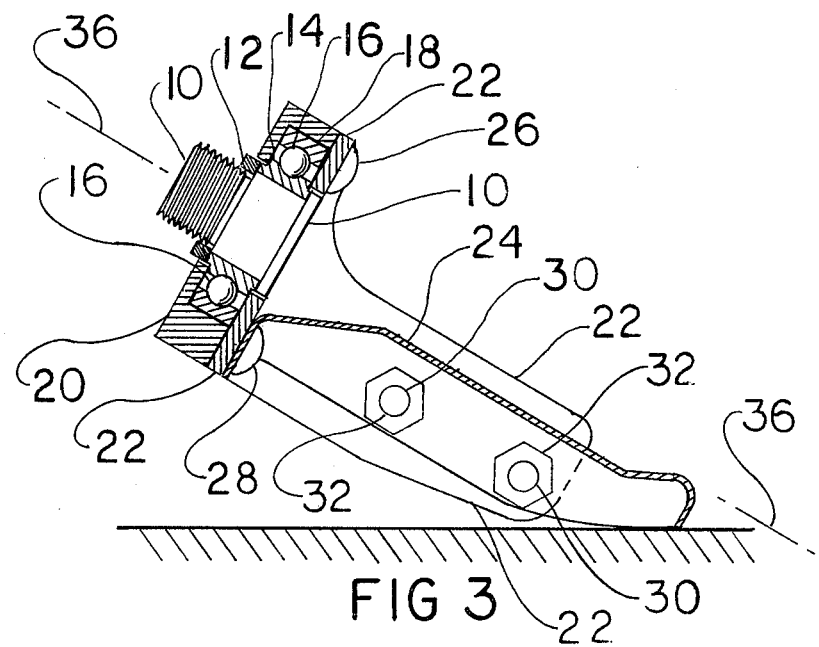
FIG. 3 is an enlarged cross section of the pedal portion of the bike of FIG. 2.

In the drawing, my pedal-bearing assembly includes a spindle 10, a spacer 12, a bearing inner race 14, ball bearings 16, a bearing outer race 18, a bearing retainer 20, a pedal frame 22, a pedal platform 24, machine screws 26, 28 and 30, nuts 32 and crank 34. The plane of support provided according to my invention for the rider's foot and coinciding with the center of rotation is shown at 36. 38 depicts the pavement or ground level. Platform 24 collects the pressure from a rider's foot (not shown) so as to distribute the load to six concentrated locations by way of machine screws 28 and 30, the load from machine screws 30 being transmitted to pedal frame 22 and the load from machine screws 28 directly to bearing retainer 20 through pedal frame 22. Pressure from rider's foot is partially collected by the pedal frame 22 and transmitted to the bearing retainer 20 via machine screws 26 and the bearing outer race 18.

While the invention has been described in terms of preferred embodiments, the claims appended hereto are intended to encompass all embodiments which fall within the spirit of the invention.

Having thus described my invention and certain preferred embodiments thereof, I claim:

1. A bearing assembly adapted for positioning between a pedal frame, pedal platform section of a bicycle and a crank, said assembly comprising a spindle, a spacer, ball bearings in a single circumferential row, a bearing retainer and inner and outer races each having a deep groove, whereby a thrust load parallel to a center of rotation in either direction and a radial load are supported, said assembly being in combination with said pedal frame and pedal platform, said pedal platform being attached on three sides, whereby the load from a rider's foot may be distributed and said pedal frame supported in fore and aft directions by said platform, said frame and platform being held against said bearing assembly by machine screws and said retainer being adapted to receive a load from said screws holding said frame against said bearing assembly.

2. The assembly of claim 1 wherein said pedal platform has a bathtub shape and said pedal platform and pedal frame are held against said bearing assembly by two machine screws adapted to transmit a load directly to said bearing retainer.

3. A bearing assembly adapted for positioning between a pedal frame, pedal platform section of a bicycle and a crank, said assembly comprising a spindle, a spacer, ball bearings in a single circumferential row, a bearing retainer and inner and outer races each having a deep groove, whereby a thrust load parallel to a center of rotation in either direction and a radial load are supported, said assembly being in combination with said pedal frame and pedal platform, said pedal platform being attached on three sides, whereby the load from a rider's foot may be distributed and said pedal frame supported in fore and aft directions by said platform, said frame being held against said platform by attachment, said frame and platform being held against said bearing assembly by attachment and said retainer being adapted to receive a load from said attachment holding said frame against said bearing assembly.

4. The assembly of claim 3 wherein said pedal platform has a bathtub shape and said pedal platform and pedal frame are held against said bearing assembly by two attachments adapted to transmit a load directly to said bearing retainer.

* * * * *